(12) United States Patent
Maynard

(10) Patent No.: US 6,364,537 B1
(45) Date of Patent: Apr. 2, 2002

(54) DUAL POLARITY FIBER OPTIC ADAPTER

(75) Inventor: Charlie Maynard, Watertown, CT (US)

(73) Assignee: The Siemon Company, Watertown, CT (US)

(*) Notice: Subject to any disclaimer, the term of this patent is extended or adjusted under 35 U.S.C. 154(b) by 0 days.

(21) Appl. No.: 09/499,970

(22) Filed: Feb. 8, 2000

(51) Int. Cl.⁷ .............................................. G02B 6/38
(52) U.S. Cl. ......................................... 385/75; 385/55
(58) Field of Search ............................. 385/52, 55, 59, 385/70, 72, 73, 75, 77, 78, 71; 439/680, 681

(56) References Cited

U.S. PATENT DOCUMENTS

| | | | |
|---|---|---|---|
| 5,041,025 A | 8/1991 | Haitmanek | 439/681 |
| 5,167,542 A | 12/1992 | Haitmanek | 439/681 |
| 5,506,922 A | * 4/1996 | Grois et al. | 385/75 |

FOREIGN PATENT DOCUMENTS

EP    1 065 542 A1    1/2001

OTHER PUBLICATIONS

Siecor Operations, LLC, MT–RJ Adapter Series, Lanscape 2, Jul., 1999.

* cited by examiner

Primary Examiner—Cassandra Spyrou
Assistant Examiner—Alessandro V. Amari
(74) Attorney, Agent, or Firm—Cantor Colburn LLP

(57) ABSTRACT

An apparatus for receiving a plurality of connector devices and for disposing the plurality of connector devices to facilitate communication among the plurality of connector devices the apparatus comprising: a first end including a first opening for receiving the connector devices; a second end disposed opposite the first end, the second end including a second opening for receiving the connector devices; an exterior surface connecting the first end and the second end; an interior surface connecting the first end and the second end; a plurality of protuberances disposed on the interior surface; a plurality of keyways disposed on the interior surface at the first end; and a latch assembly comprising a movable or a fixed member disposed on the exterior surface at the first end, capable of a first position concealing one of the plurality of keyways and a second position exposing the one of the plurality of keyways.

32 Claims, 14 Drawing Sheets

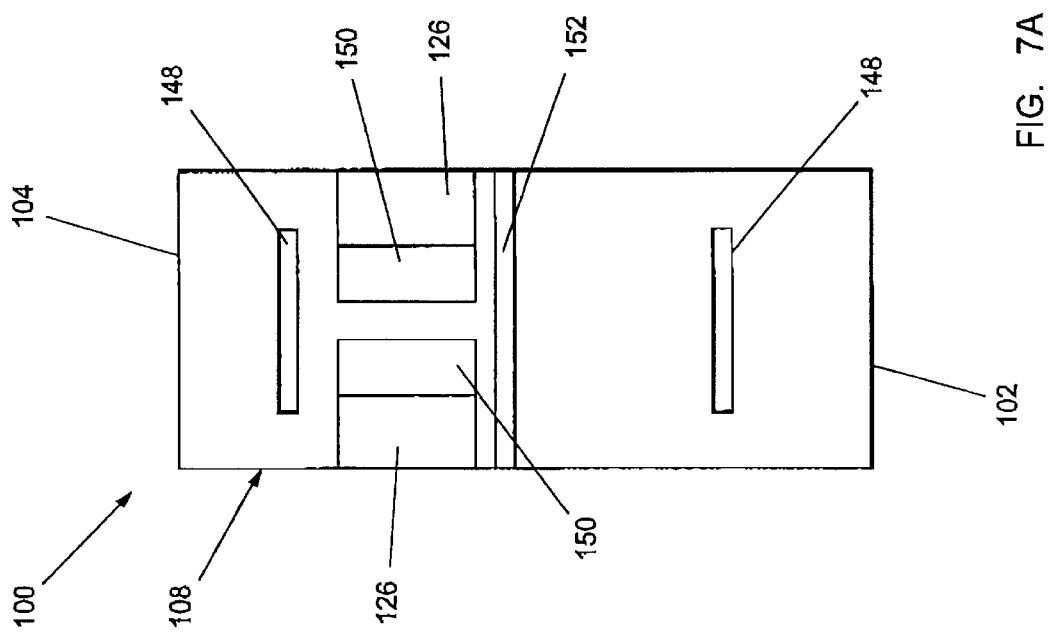

DUAL POLARITY FIBER OPTIC ADAPTER

BACKGROUND OF THE INVENTION

The present invention relates generally to fiber optic connection assemblies and particularly to a fiber optic adapter with reversible polarity.

As is commonly known in the art, the polarity of fibers in a fiber optical connection must be maintained to ensure proper transmission of an optical signal. Improperly mated fibers in which the polarity is reversed terminates the propagated optical signal.

FIG. 1 depicts an exploded perspective view of a fiber optic connector assembly 10 common in the art. The connector assembly 10 includes a connector 12 and an adapter 14. The connector 12 has a mating end 16 and a termination end 18. The termination end 18 includes a cable (not shown) terminated thereupon via a termination method common in the art. The mating end 16 of the connector 12 includes a latch 22. The adapter 14 includes a first receiving end 24 and a second receiving end 26. The first receiving end 24 includes an opening 28 for receiving the mating end of the connector 12 when creating the connection assembly 10. The second receiving end 26 includes an opening (not shown) for receiving a second connector (not shown). The first receiving end 24 further includes a keyway 30 for receiving the latch 22 when mating the adapter 14 with the connector 12. The adapter 14 will only receive the connector 12 when the latch 22 is in alignment with and received by the keyway 30. This allows fibers in the connector assembly 10 to be mated in a prescribed disposition thus establishing and maintaining the polarity of the optical connection as is required for effective propagation of the optical signal.

Prior to assembling the connector assembly 10 of FIG. 1, the cable containing the optical fibers is terminated upon the termination end 18 of the connector 12. The mating of the adapter 14 and the connector 12 utilizing the keyway/latch arrangement described herein above allows for proper polarity of the connector assembly 10 only in so far as the termination of the cable is preformed correctly. Improper termination will result in fiber misalignment when the connector 12 is mated with a second connector (not shown) of a second cable (not shown) within the adapter 14, thus preventing the polarity necessary to transmit an optical signal through the connector assembly 10.

One remedy available to the installer in an instance of improper termination of a polarized fiber optical connector, as described herein above, is for the installer to disconnect the cable from the connector 12 and re-terminate the fibers at the termination end 18 of the connector 12. This remedy, however, requires a laborer skilled in the art to perform a costly, time consuming technical reparation.

FIG. 2 depicts a prior art fiber optic adapter 50 that offers dual polarity at a first end 52 such that, in the case of an improperly terminated cable, the adapter 50 may be rotated one-half turn, i.e. one-hundred and eighty degrees, and fitted onto the connector thus reversing the optical connection to restore proper polarity. The dual polarity of the adapter 50 is achieved by a dual keyway system comprising a first keyway 54 and a second keyway 56. The keyways 54 and 56 are disposed on the adapter 50 such that the latch 22 of the connector 10 of FIG. 1 may be received in two opposing directions thus allowing the reversal of the polarity of the optical connection. However, the adapter 50 does not prevent a mis-alignment of the fibers of the connection nor does it indicate the proper positioning of the connector to maintain polarity of the connection. The adapter 50 simply allows proper polarization to be achieved through a trial and error approach involving connecting, disconnecting, and reconnecting the adapter 50 to a connector and testing the connection for proper polarization. This approach is time consuming and highly inefficient in large optical systems common to modem commercial and industrial applications.

SUMMARY OF THE INVENTION

An apparatus for receiving a plurality of connector devices and for disposing the plurality of connector devices to facilitate communication among the plurality of connector devices, the apparatus comprising: a first end including a first open for receiving the connector devices; a second end disposed opposite the first end, the second end including a second opening for receiving the connector devices; an exterior surface connecting the first end and the second end; an interior surface connecting the first end and the second end; a plurality of protuberances disposed on the interior surface; a plurality of keyways disposed on the interior surface at the first end; and a latch assembly comprising a movable or a fixed member disposed on the exterior surface at the first end, capable of a first position concealing one of the plurality of keyways and a second position exposing the one of the plurality of keyways.

BRIEF DESCRIPTION OF THE DRAWINGS

Referring now to the drawings wherein like elements are numbered alike in the several FIGURES:

FIG. 7A is a bottom elevation view of the fiber optic adapter of FIG. 3;

DETAILED DESCRIPTION OF THE PREFERRED EMBODIMENTS

Figure 3:
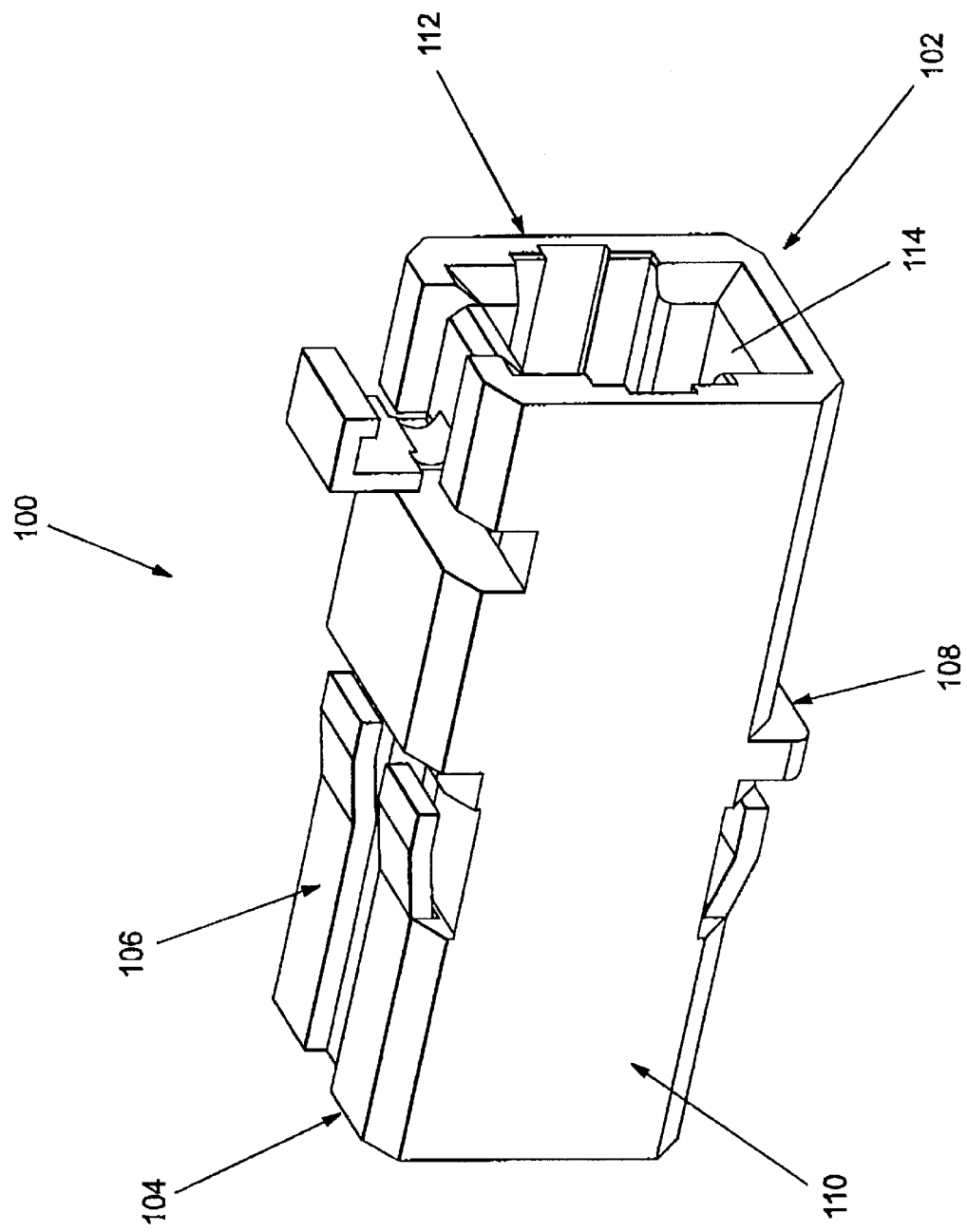
FIG. 3 is Perspective view a dual polarity fiber optic adapter in one embodiment of the present invention.

FIG. 3 shows a perspective view of a preferred embodiment of a dual polarity fiber optic adapter 100 in accordance with the present invention. The adapter 100 includes a first receiving end 102 and a second receiving end 104. The adapter 100 further includes a top member 106, a bottom member 108, a first side member 110, and a second side member 112.

The top member 106, the bottom member 108, the first side member 110, and the second side member 112 may each, in a preferred embodiment, be planar in description and may be substantially rectangular in shape. The top member 106, the bottom member 108, the first side member 110, and the second side member 112 may be rigidly mounted to each other so as to form a rectilinear solid shaped adapter 100. The first side member 110 may be mounted to an edge of the top member 106 such that the first side member 110 is substantially perpendicular relative to the top member 106. The bottom member 108 may be rigidly mounted to an edge of the first side member 110 opposite the mounting of the top member 106 such that the bottom member 108 is perpendicular to the first side member 110 and parallel and appositional to the top member 106. The second side member 112 may be rigidly mounted to the top member 106 and the bottom member 108 such that the second side member 112 is parallel and appositional to the first side member 110.

The top member 106, the bottom member 108, the first side member 110, and the second side member 112 may each be of sufficient thickness to create a hollow 114 in the adapter 100 when the members 106, 108, 110, and 112 are disposed as described herein above.

Figure 4A:
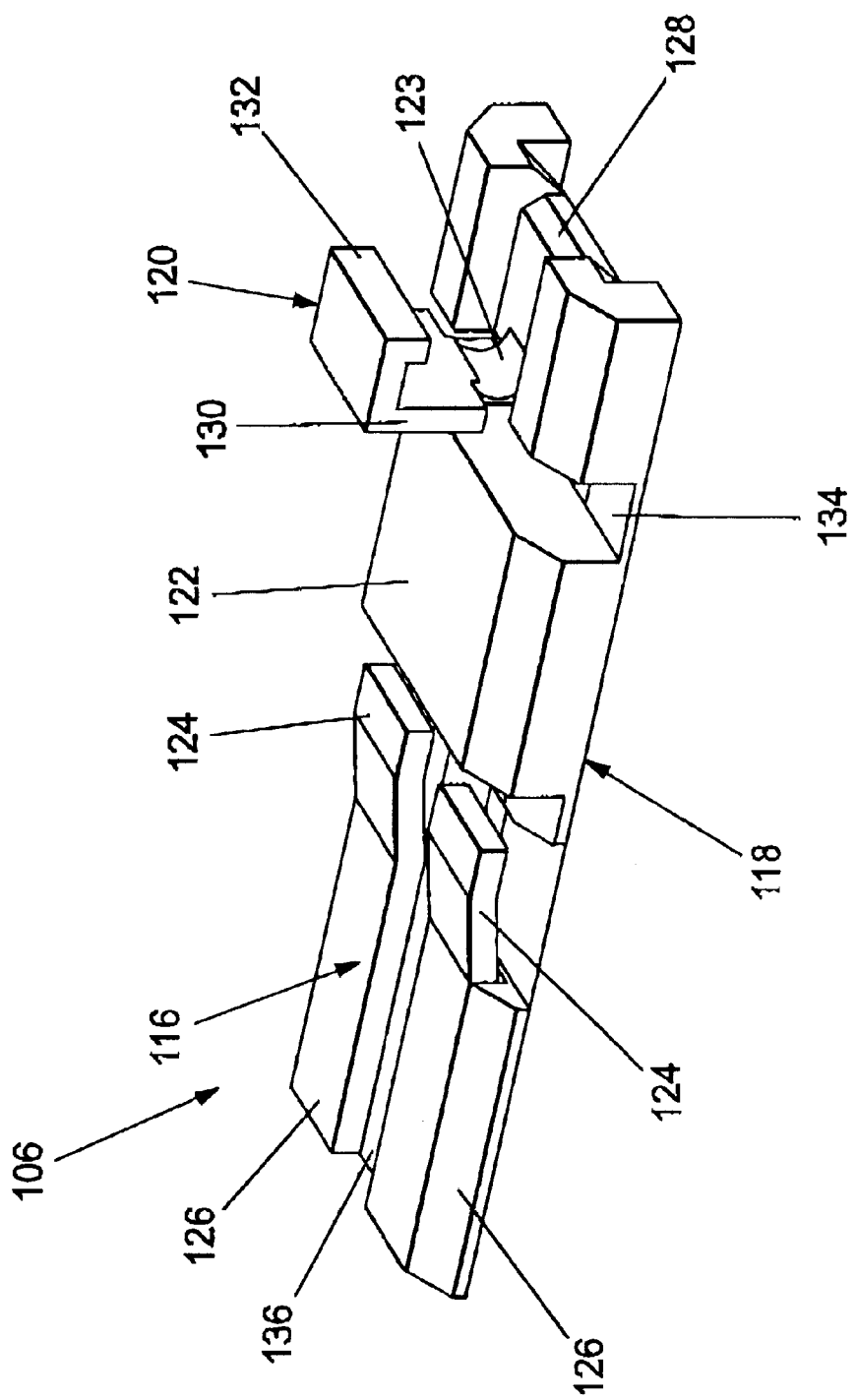
FIG. 4A is a Perspective view of a top member of the fiber optic adapter of FIG. 3.

FIG. 4A provides a perspective view of the top member 106 of the dual polarity fiber optic adapter 100 in accordance with the present invention. The top member 106 includes an exterior surface 116 and an interior surface 118. The exterior surface 116 includes a latch assembly 120, a latch housing 122, a plurality of angled flanges 124, a plurality of protuberances 126, and a latch port 128.

Figure 4B:
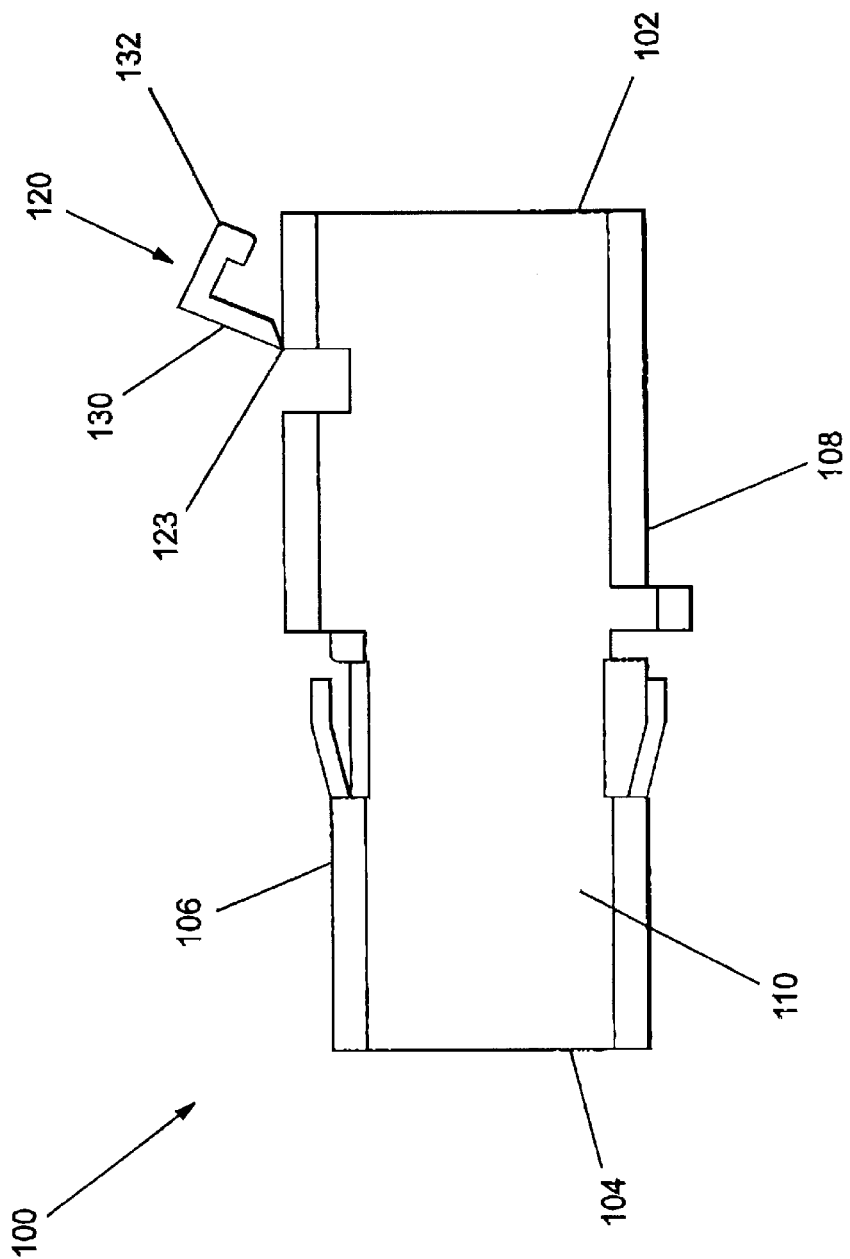
FIG. 4B is side elevation view of the fiber optic adapter of FIG. 3.

The latch assembly 120 includes a mounting portion 130 and a latching portion 132. The latch housing 122 includes a latch cut-out 134 which may be disposed substantially perpendicular to the longitudinal axis of the top member 106. The mounting portion 130 of the latch assembly 120 is mounted on the latch housing 122 adjacent the latch cut-out 134. In a preferred embodiment, the mounting portion 130 of the latch assembly 120 may be mounted to the latch housing 122 by a hinge element 123 that permits the latching portion 132 of the latch assembly 120 to rotate about the axis of mounting such that the latching portion 132 of the latch assembly 120 may engage the latch port 128. The hinge element 123 may be any of a plurality of elements that allow rotation about an axis including, but not limited to, a living hinge. FIG. 4B shows a side elevation view of the adapter 100 depicting the first side member 110 and a side view of the latch assembly 120 and the mounting on the top member 106 thereof.

Figure 5:
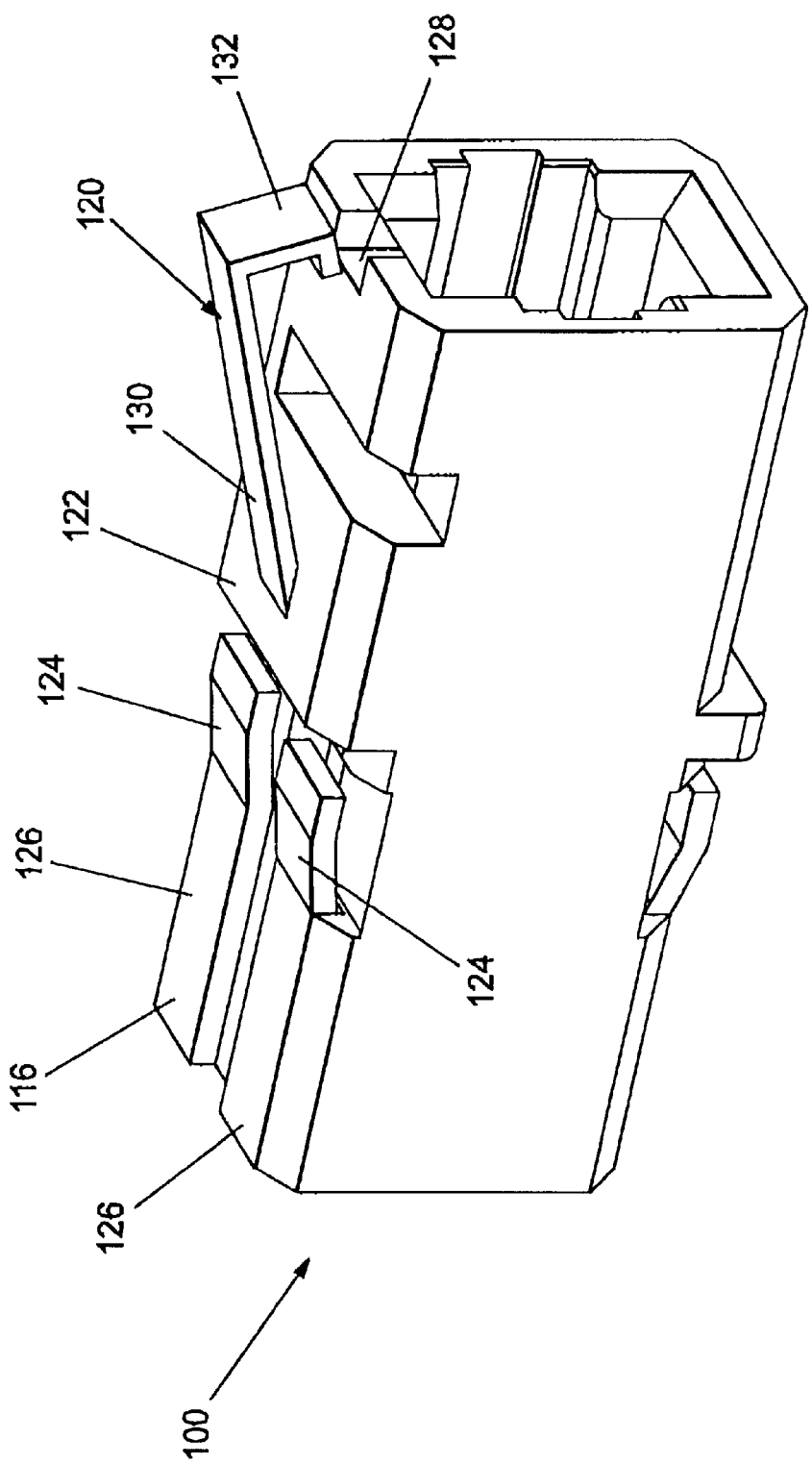
FIG. 5 is a Perspective view of a dual polarity fiber optic adapter in another embodiment of the present invention.

Alternatively, the mounting portion 130 of the latch assembly 120 may be rigidly mounted at the latch housing 122 as is depicted in FIG. 5. The latch assembly 120 may be mounted on the latch housing 122 with the assembly 120 angled toward the first receiving end 102 of the adapter 100. The latch assembly 120 may be elongated and may be of a sufficiently pliable composition to allow the latching portion 132 to move relative to the mounting portion 130 such that the latching portion 130 may engage the latch port 128 to effect the polarization of the adapter 100, as is described further herein below.

Referring again to FIG. 4A, the latch assembly 120 may be moved into a first position engaging the latch port 128 or the latch assembly 120 may be moved into a second position disengaged from the latch port 128 (as shown) depending on the polarity desired in a particular application of the adapter 100, as is discussed further herein below. The latch port 128 comprises a detent and front edge in the top surface 106 at the first receiving end 102 of the adapter 100.

As discussed above, the top member 106 of the adapter 100 includes a plurality of protuberances 126. In one preferred embodiment of the present invention, the adapter 100 may contain two protuberances 126 rigidly mounted at the second receiving end 104 of the adapter 100. The protuberances 126 may be substantially rectangular in shape with a width sufficient to create a channel 136 disposed between the two protuberances 126, parallel to the longitudinal axis of the top member 106.

Referring still to FIG. 4A, in a preferred embodiment of the present invention, the top member 106 of the adapter 100 also includes two angled flanges 124 corresponding to the two protuberances 126. The angled flanges 124 are mounted, at one end, to the protuberances 126 and are free-standing at an opposite end. Angled flanges 124 are used to secure the adapter 100 to a panel.

Figure 6:
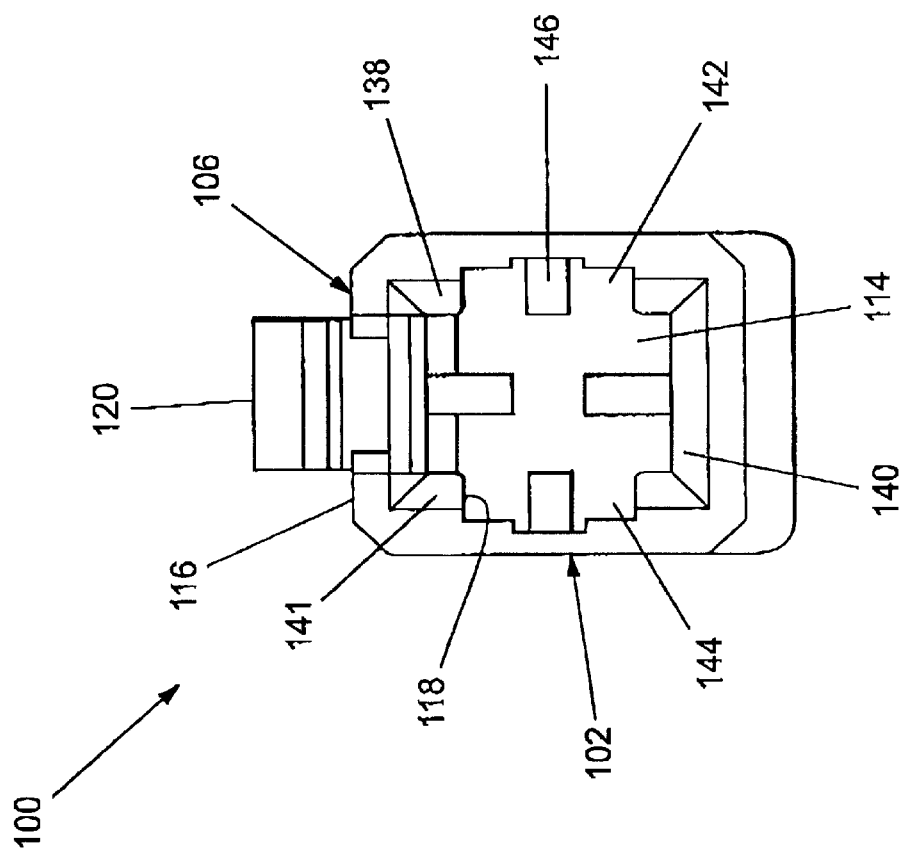
FIG. 6 is a front elevation view of the fiber optic adapter of FIG. 3.

FIG. 6 depicts a front elevation view of the first receiving end 102 of the dual polarity adapter 100 in a preferred embodiment of the present invention. The interior surface 118 of the top member 106 includes a first keyway 138 for guiding and receiving a connector into the interior 114 of the adapter 100. The interior surface of the bottom member 108 includes a second keyway 140 disposed parallel to and appositional to the first keyway 138. The interior surface of the first side member 110 includes a first guide channel 142 disposed perpendicular to the first keyway 138. The interior of the second side member 112 includes a second guide channel 144 disposed parallel and appositional to the first guide channel 142. The guide channels 142 and 144 may extend the length of the interior 114 of the adapter 100 and serve to facilitate the adapter 100 in receiving a connector and in establishing a fiber optical connection, as is described further herein below. The keyways 138 and 140 may extend the length of the interior 114 of the adapter 100 the keyways ceasing at the second receiving end 104. The surface of the first and second keyways, 138 and 140, respectively, at the first receiving end 102 may include bevels 141 beveled to facilitate reception of a connector in utilization of the adapter 100.

The interior 114 of the dual polarity adapter 100 further includes a plurality of alignment flanges 146. The alignment flanges 146 are members rigidly mounted to the interior surfaces of the top member 106, the bottom member 108, the first side member 110, and/or the second side member 112 such that the alignment flanges 146 extend perpendicularly from the members 106, 108, 110, and/or 112 toward the longitudinal axis of the adapter 100. In one preferred embodiment of the present invention, the interior 114 of the adapter 100 includes four rectangular shaped alignment flanges 146 disposed on the interior surfaces of the top member 106, the bottom member 108, the first side member 110, and the second side member 112, respectively, such that the flanges 146 extend perpendicularly from the members 106, 108, 110, and 112. The alignment flanges 146 engage grooves 147 on connector 12.

FIG. 7A shows an elevation view of the dual polarity adapter 100 depicting the bottom member 108 in accordance with the present invention. The bottom member 108 includes a plurality of slots 148, a plurality of angled flanges 126, a plurality of detents 150, and a connector rail 152. In one preferred embodiment of the present invention, the bottom member 108 includes two slots 148 each disposed a prescribed distance from the first receiving end 102 and the second receiving end 104, respectively, of the dual polarity adapter 100. The connector rail 152 is disposed perpendicularly to the longitudinal axis of the adapter 100 and extends away from the bottom surface 108 to facilitate fiber optic connector reception at the first and second receiving ends 102 and 104, respectively, of the adapter 100. In one preferred embodiment, the bottom member 108 includes two angled flanges 126 substantially equivalent to those described herein above with reference to the top member 106. The angled flanges 126 are mounted at one end to the bottom member 108 and extend in an angled orientation toward the connector rail 152. The bottom member 108 may include two detents 150 shaped substantially as rectangles disposed adjacent to the angled flanges 126.

Figure 1:
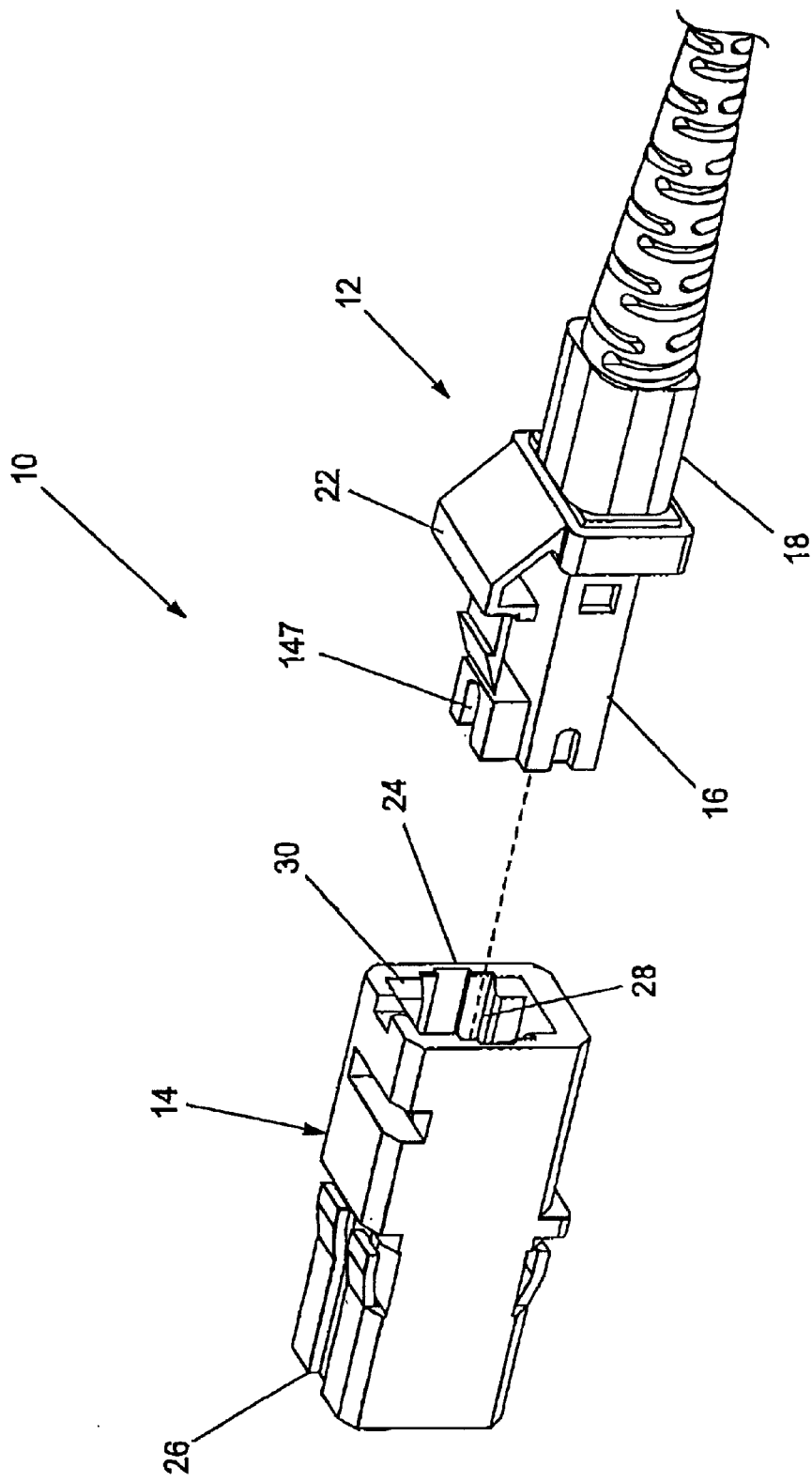
FIG. 1 is a Perspective exploded view of a connector assembly common in the art.
Figure 2:
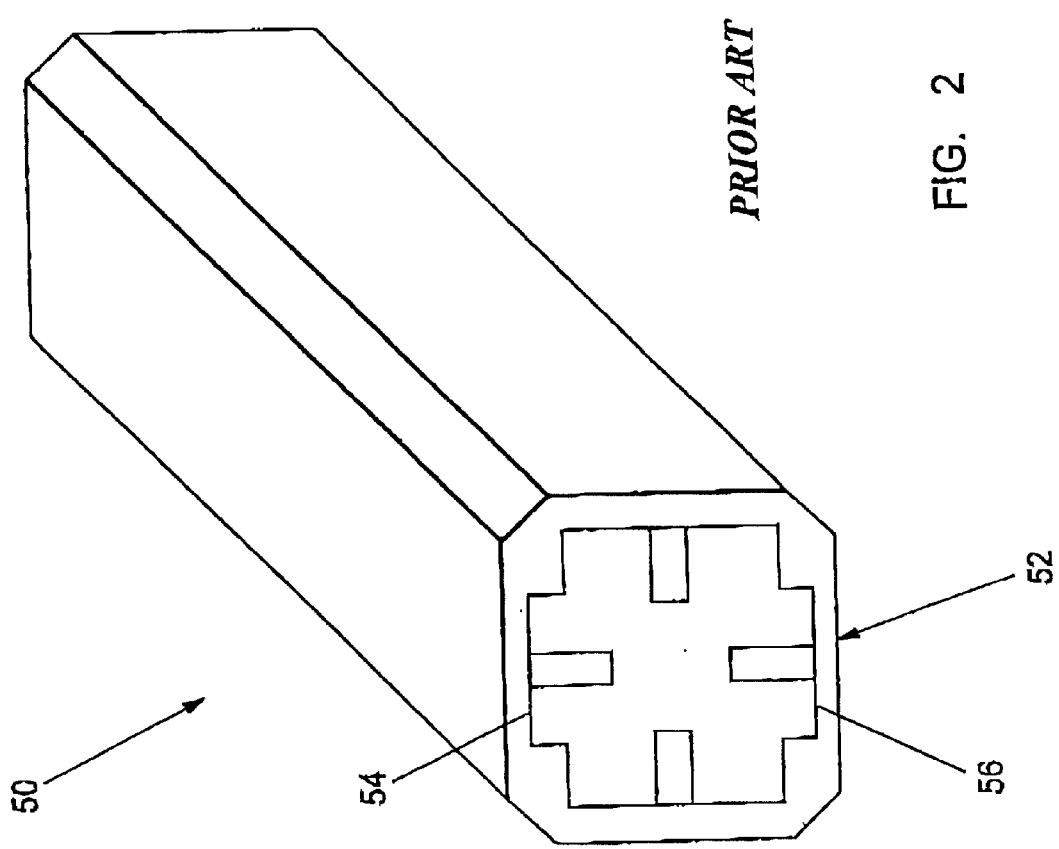
FIG. 2 is a Perspective view of a dual polarity fiber optic adapter of the prior art.
Figure 7B:
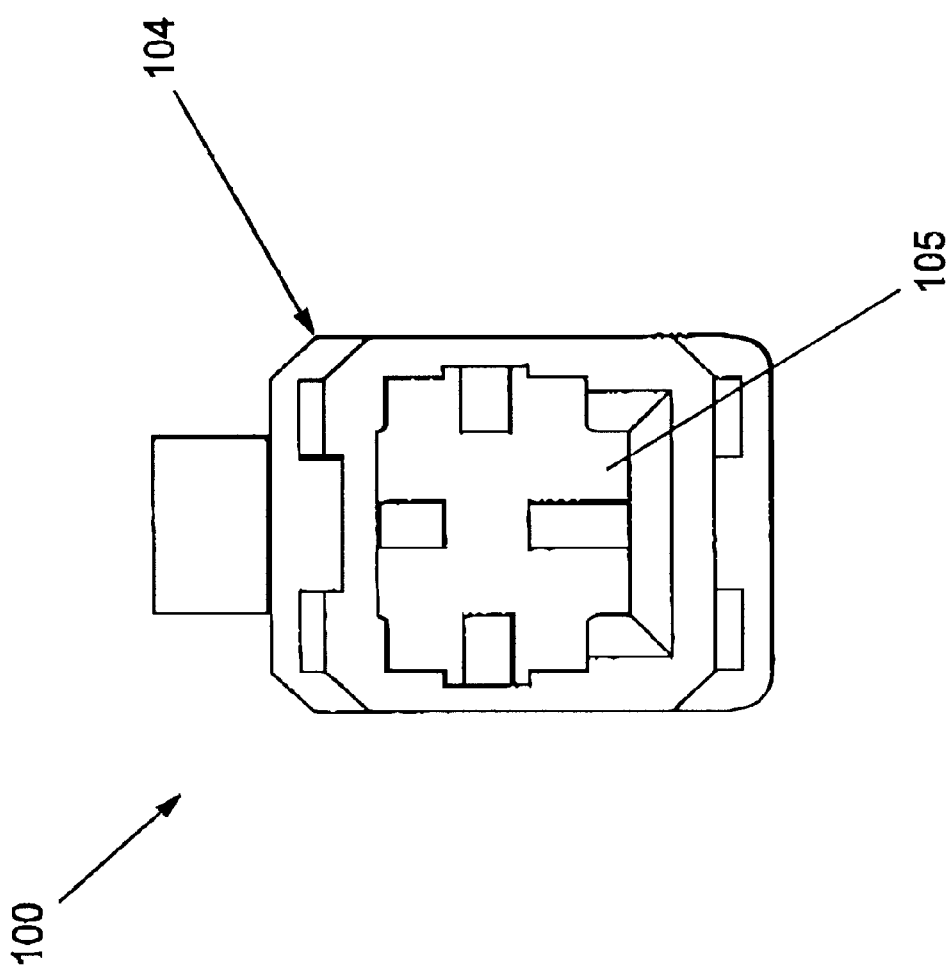
FIG. 7B is a front elevation view of the fiber optic adapter of FIG. 3.

FIG. 7B depicts an elevation view of adapter 100 in one embodiment of the present invention showing the second receiving end 104. The second receiving end 104 may be singular in polarity in that it may receive a connector in only one direction. There may not exist a dual keyway arrangement on the second receiving end 104. The second receiving end 104 may include a single keyway 105 for receiving the latch 22 of an optical connector 12 of FIG. 1.

The use of the dual polarity fiber optic adapter in accordance with the present invention will now be discussed with reference to FIGS. 3, 4A, 4B, 6, and 7A. A first cable containing optical fibers is terminated on a first optical connector using methods common in the art. A second fiber optic cable is terminated on a second optical connector using methods common in the art. The second optical connector is mated with the adapter 100 by inserting the connector into the second receiving end of the adapter 100.

The latch assembly 120 of the adapter 100 is moved into the engaged position by rotating the latching portion 132 relative to the mounting portion 130 such that the latching portion 132 snaps into locking engagement with the latch port 128, thereby polarizing the first receiving end 102 of the adapter 100. The first connector is mated with the first receiving end 102 of the adapter 100 by aligning the first connector in accordance with the second keyway 140 of the first receiving end 102 and inserting the first connector into the adapter 100.

Should the connection assembled as described above fail to work, the first connector is removed and the latch assembly 120 disengaged so that the latching portion 132 of the latching assembly 120 no longer contacts the latch port 128, thus permitting the installer to reverse the polarity of the adapter. The first connector is rotated one-half revolution, i.e. one-hundred eighty degrees, relative to the adapter 100. With the latch assembly 120 disengaged and the connector rotated one-half turn relative to the adapter 100, the connector is again mated with the adapter 100 by inserting the connector into the interior 114 of the adapter 100 with reference to the first keyway 138. The polarity of the adapter has been reversed without the time and cost allocation associated with disassembling and reassembling the cable termination of the first connector. The disengaged latch assembly 120 now indicates the polarity of the adapter 100, instructing subsequent users and installers to utilize the first keyway 138 if reconnection is required.

Figure 8:
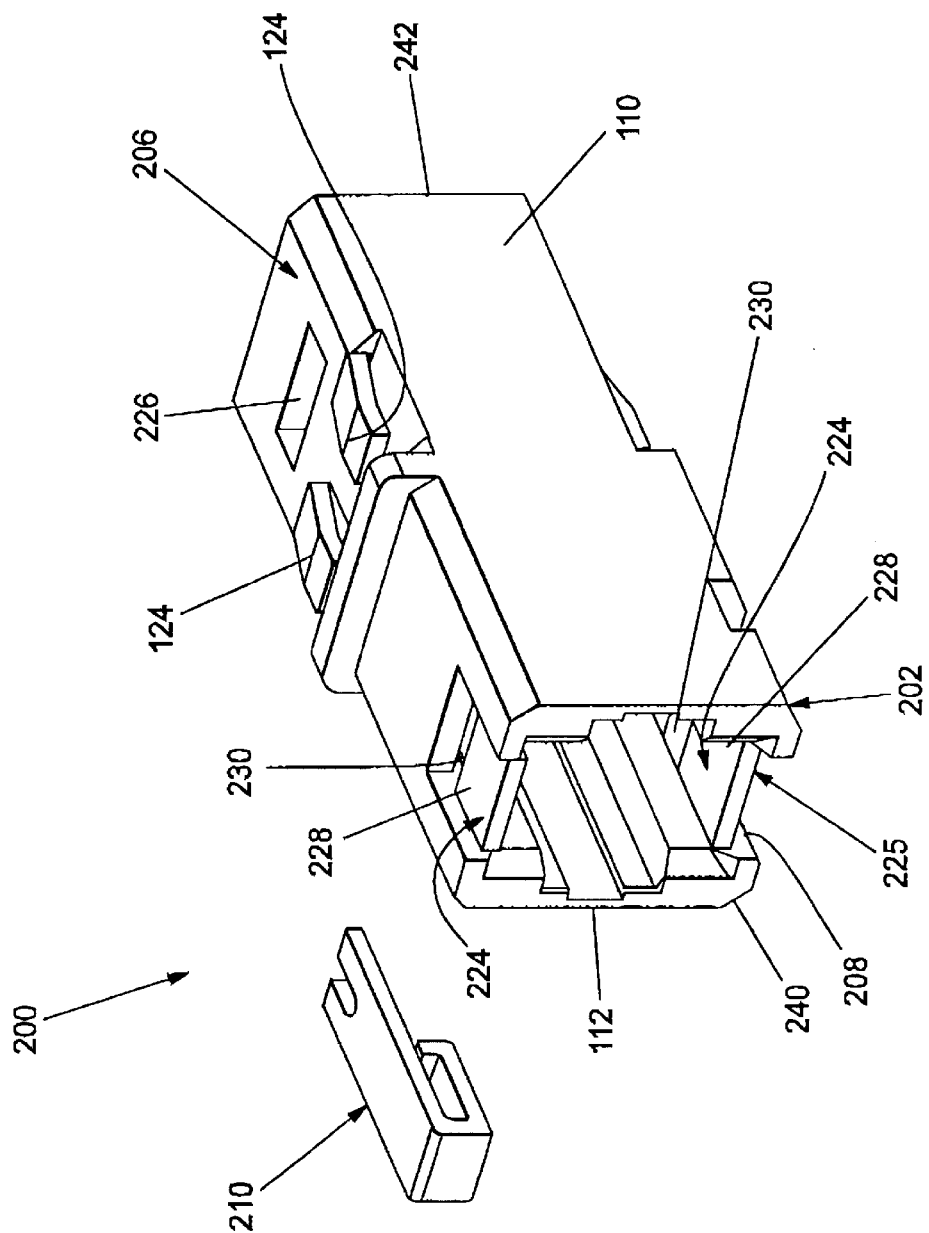
FIG. 8 is a Perspective view of a dual polarity fiber optic adapter in another embodiment of the present invention.

A second embodiment of the present invention is depicted in FIG. 8. A dual polarity adapter is shown in a perspective view, generally at 200. The adapter 200 is of similar construction as the adapter 100, save for the latch assembly 120 of the adapter 100 which is omitted from the design of the adapter 200. The adapter 200 includes an adapter body 202 and a removable latch member 210 for reversing the polarity of the adapter 200. The removable latch member 210 snaps into engagement with a first latch port 224 or a second latch port 225 disposed on the adapter body 202 as is required for the particular fiber optic connection application, as is discussed herein below.

Figure 9A:
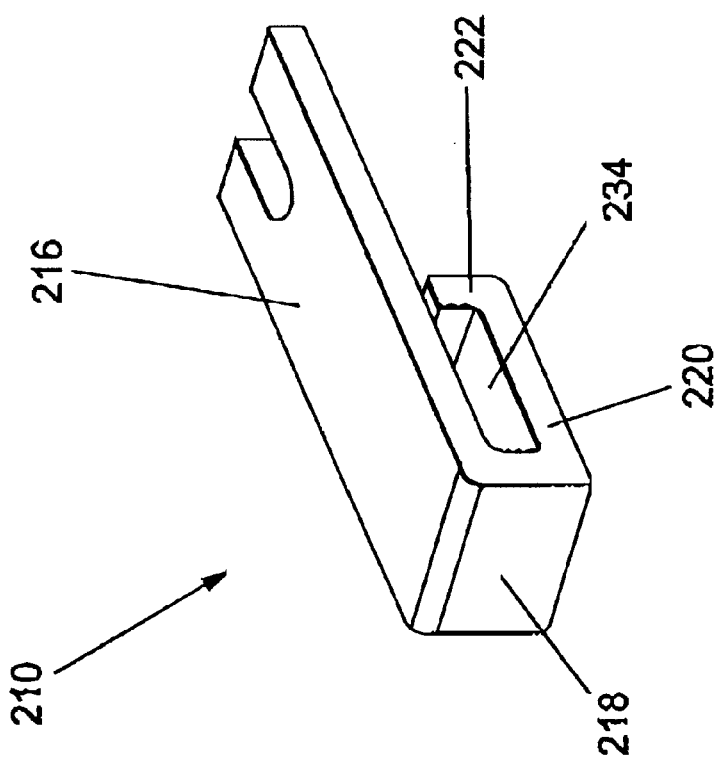
FIG. 9A is a Perspective view of a removable latch member of the fiber optic adapter of FIG. 8.

Referring to FIG. 9A, in one embodiment of the dual polarity fiber optic adapter 200, in accordance with the present invention, the removable latch member 210 includes a first member 216, a second member 218, a third member 220, and a lock member 222. The second member 218 is rigidly mounted at one end of the first member 216 such that the second member 218 is substantially perpendicular to the first member 216. The third member 220 is rigidly mounted at the end of the second member 218 opposite the mounting of the first member 216. The third member is disposed substantially appositional and parallel to the first member 216. The lock member 222 is rigidly mounted to the end of the third member 220 opposite the mounting of the second member 218 such that the lock member 222 is appositional and parallel to the second member 218. A lock grove 234 is created by the above described mounting of the first member 216, the second member 218, the third member 220, and the lock member 222. The lock groove 234 receives the latch port 224 in polarization of the adapter 200, as is discussed further herein.

Referring again to FIG. 8, the adapter body 202 includes a top member 206 and a bottom member 208. The adapter body 202 further includes the first side member 110 and the second side member 112 discussed herein above with reference to the dual polarity fiber optic adapter 100. The adapter body 202 includes a first receiving end 240 and a second receiving end 242. The top member 206 includes a latch port 224 and a slot 226. The top member 206 further includes the plurality of angled flanges 124 and the connector rail 152 described herein above with reference to the adapter 100.

The latch port 224 is substantially a rectilinear opening in the top member 206 at the first receiving end 240 of the adapter body 202. The latch port 224 includes a mating member 228 disposed within the latch port 224. The mating member 228 is of sufficient size to create a mating groove 230 disposed adjacent to the mating member 228 in the latch port 110 224. The mating groove passes through the top member 206 thus exposing the interior of the adaptor body 202. The bottom member 208 is identical to the top member 206, thus to avoid repetition and to maintain brevity, a description of the bottom member is omitted in lieu of the description of the top member 206 herein.

The use of the adapter 200 will now be described. A first fiber optical cable is terminated on a first optical connector using any of a plurality of methods common in the art. A second fiber optical cable is terminated on a second optical connector using any of a plurality of methods common in the art. The removable latch member 210 is moved into contact with the adapter body 202 such that removable latch member 210 snaps into place about the mating member 228. The mating member 228 is received in the lock groove 234 such that the lock member 222 extends into the mating groove from the exterior of the adapter 200 to the interior, thus locking the removable latch member 210 into place.

Positioned as such, the first member 216 of the removable latch member 210 is disposed on the interior of the adapter body 202 and the third member 220 on the exterior. Engaging the removable latch member 210 as described above polarizes the adapter 200 by blocking the keyway of the top member 206 from the insertion of a connector.

The second optical connector is inserted in the second receiving end 242 of the adapter 200. The first optical connector is inserted in the first receiving end 240 of the adapter 200 utilizing the available keyway of the bottom member 208. Should the desire to reverse the polarity of the adapter 200 arise, the first optical connector is removed from the adapter 200 and the removable lock member 210 is disengaged by unsnapping the lock member 222 from the mating groove 230 and removing the mating member 228 from the lock groove 234.

Next, the connector is rotated one-half revolution, i.e. one-hundred eighty degrees, relative to the adapter. The removable lock member 210 is then fitted into the latch port 225 of the bottom member 208 as described above with reference to the top member 206. The polarity of the adapter 200 is now reversed and the adapter 200 may receive the first connector utilizing the exposed keyway of the top member 206.

Figure 9B:
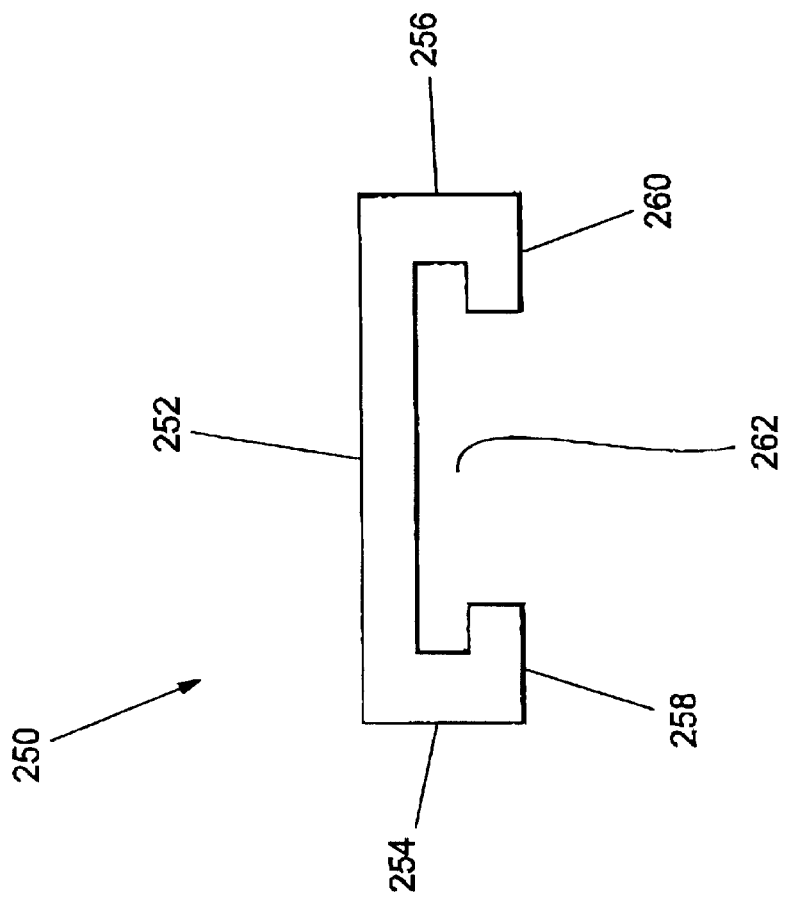
FIG. 9B is a side elevation view of another embodiment of the removable latch member of the fiber optic adapter of FIG. 8.

FIG. 9B is a side elevation view of a second removable latch member 250 which may be used with the adapter body 202 of the adapter 200 as an alternative to the removable latch member 210. The second removable latch member 250 includes a first member 252, a second member 254 disposed perpendicular to the first member 252, and a third member 256 disposed perpendicular to the first member 252 and appositional to the second member 254. The second removable latch member 250 further includes a first lock member 258 disposed perpendicular to the second member 254 and appositional to the first member 252. The second latch member 250 further includes a second lock member 260 disposed perpendicular to the third member 256 and appositional to the first member 252. Disposition of the first, second, and third members 252, 254, and 256, respectively, and of the first and second lock members 258 and 260, respectively, create a snap groove 262.

The second removable latch assembly 250 is used with the adapter body 202 similar to the use of the removable latch assembly 210 discussed herein above. Generally, when polarization of the adapter body 202 is desired, the first and second lock members are snap fitted about the mating member 228 such that the mating member is received in the snap groove 262 and the first lock member and second lock members are disposed on the interior of the adapter body 202 and the second member 254 is disposed in the mating groove 230. Reversal of polarity is achieved by unsnapping the second removable latch member 250, rotating the connector one-half turn, i.e. one hundred eighty degrees, and re-snapping the second removable latch member about the mating member 228 opposite the first mounting.

Figure 9C:
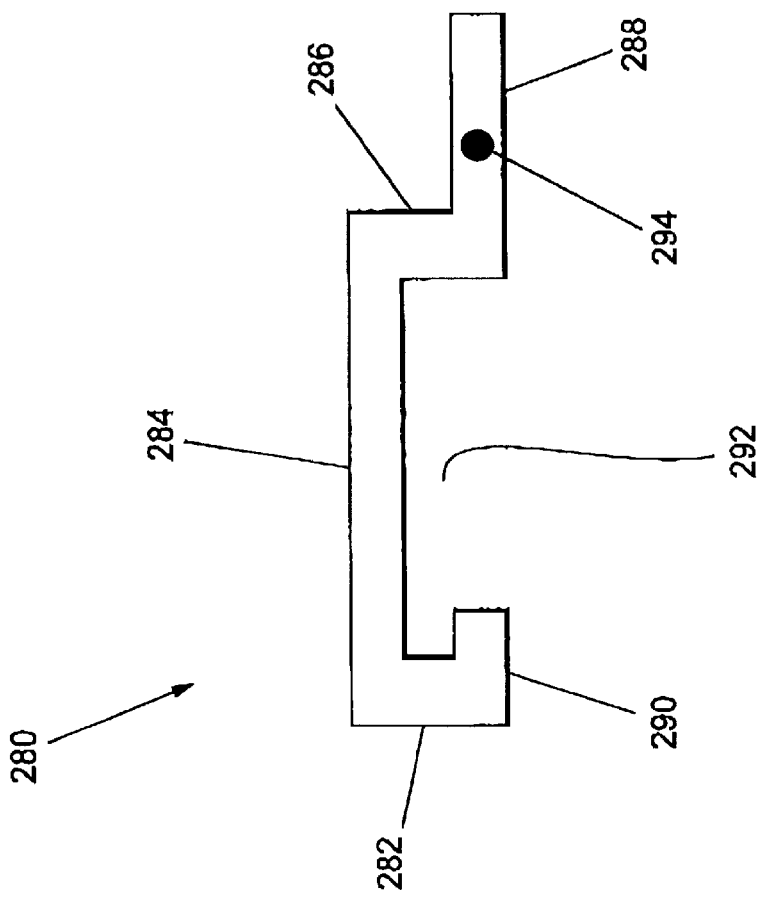
FIG. 9C is a side elevation view of another embodiment of the removable latch member of the fiber optic adapter of FIG. 8.

FIG. 9C depicts a side elevation view of a third removable latch member 280 for use with the adapter body 202. The third removable latch member 280 includes a first member 282, a second member 284 mounted perpendicular to the first member 282, a third member 286 mounted to the second member 284 parallel and appositional to the first member 282, and a fourth member 288 mounted perpendicular to the third member 286 and extending from the third member 286 in a direction away from the first member 282. The third removable latch member 280 further includes a lock member 290 and a groove 292 formed by the disposition of the first, second, and third members 282, 284, and 286, respectively, and the lock member 290. The third removable latch member may further include a protuberance 294 disposed, for example, on the fourth member 288.

The third removable latch member 280 is used in conjunction with the adapter body 202 of FIG. 8 to polarize the adapter 200. To effectively polarize the adapter body 202, the fourth member 288 is inserted through the mating groove 230 into the interior of the adapter body 202. The mating member 228 is received in the snap groove 292 as the lock member 290 snaps into place about the mating member 228. As positioned, the second member 284 remains on the exterior of the adapter body 202. The protuberance may be received by a detent (not shown) on the latch port 224 or on the interior of the adapter body 202 to further secure the third removable latch member 280 to the adapter body 202.

To reverse polarize the adapter 200 fitted with the third removable latch assembly 280 the assembly 280 is removed from the latch port 224, and the assembly 280 is mounted on the latch port 225 opposite the original mounting.

Figure 10:
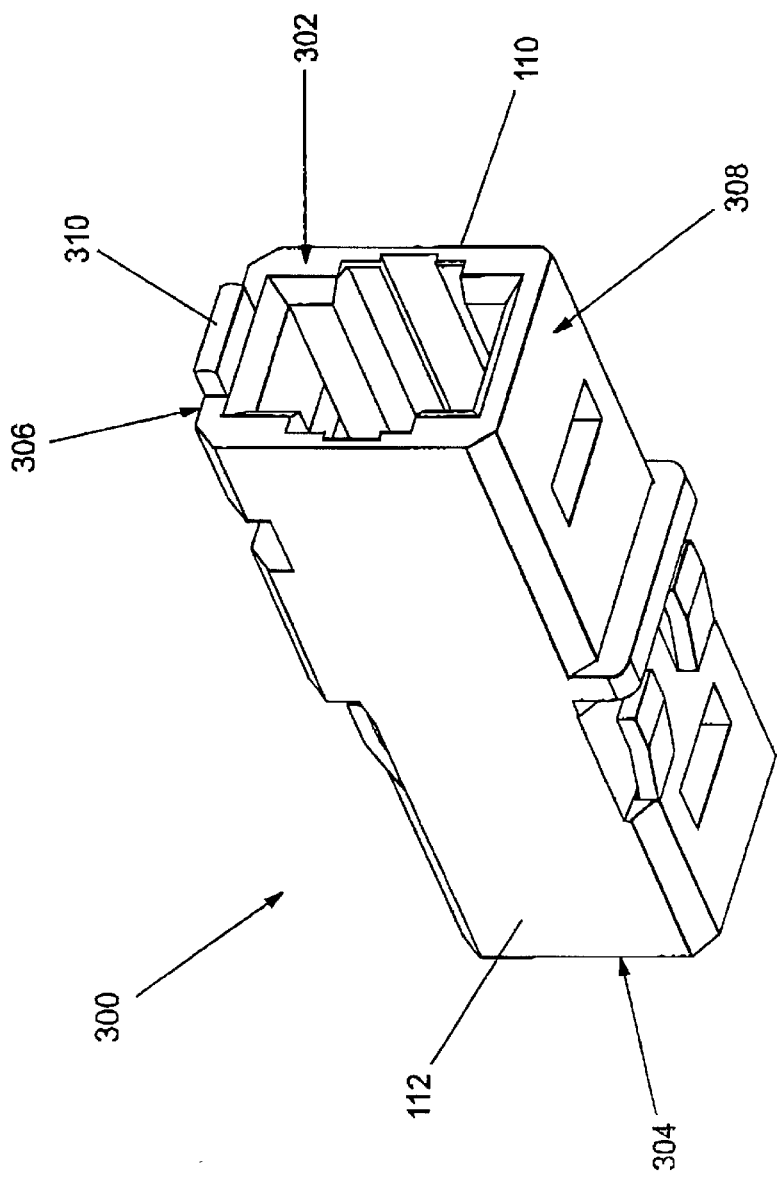
FIG. 10 is a Perspective view of a dual polarity fiber optic adapter in another embodiment of the present invention.

FIG. 10 shows a perspective view of another alternative embodiment of the present invention. A dual polarity adapter 300 is depicted comprising a first receiving end 302, a second receiving end 304, a top member 306, a bottom member 308, and a polarity tab 310. The adapter further includes the first side member 110 and the second side member 112 described herein above with reference to the dual polarity fiber optic adapter 100.

The top member 306 is identical to the top member 106 of the adapter 100 save for the latch assembly 120 which is not included on the top member 306. Thus, a detailed description of the top member 306 is omitted in lieu of the above description of the top member 106 of the adapter 100. The bottom member 308 includes the plurality of slots 148, the plurality of angled flanges 126, and the connector rail 152, as these elements are described herein above with reference to the bottom member 108 of the adapter 100.

The polarity tab 310 is rigidly mounted to the top member 306 at the first receiving end 302 of the adapter 300. The polarity tab 310 extends from the adapter 300 away from the first receiving end 302 of the adapter 300. The polarity tab 310 polarizes the adapter 306 by preventing connector access to the keyway of the top member 306. If a reverse polarity is desired, the polarity tab 310 may be manually disengaged by rotating the polarity tab 310 back and forth about the axis of mounting until the tab 310 snaps off. The adapter is now reversed polarized and is prepared to receive a connector in this reverse polarization state as a particular fiber connection application requires. The disengaged polarity tab 310 indicates to subsequent operators and installers that a polarity reversal was necessary, thus, expressing the current reverse polarity state of the adapter 300.

What is claimed is:

1. An apparatus for receiving a plurality of connector devices and for disposing said plurality of connector devices to facilitate communication among said plurality of connector devices, the apparatus comprising:

a first end including a first opening for receiving said connector devices;

a second end disposed opposite said first end, said second end including a second opening for receiving said connector devices;

an exterior surface connecting said first end and said second end;

an interior surface connecting said fist end and said second end;

a plurality of protuberances disposed on said interior surface;

a plurality of keyways disposed on said interior surface at said first end; and a latch assembly comprising a movable member disposed on said exterior surface at said first end, such as to have a first position concealing only one of said plurality of keyways and a second position exposing said one of said plurality of keyways.

2. The apparatus of claim 1 further comprising a first member, a second member disposed perpendicular to said first member, a third member disposed opposite and parallel to said first member and perpendicular to said second member, and a fourth member disposed opposite and parallel to said second member and perpendicular to said third member.

3. The apparatus of claim 2 wherein said first member, said second member, said third member, and said fourth member are each rectangular planar elements each including an outer surface and an inner surface.

4. The apparatus of claim 3 wherein said exterior surface comprises the outer surfaces of said first member, said second member, said third member, and said fourth member.

5. The apparatus of claim 3 wherein said interior surface comprises the inner surfaces of said first member, said second member, said member, and said fourth member.

6. The apparatus of claim 1 further comprising a second plurality of protuberances disposed on said exterior surface, said second plurality of protuberances including a plurality of raised members disposed on said exterior surface at said second end of said apparatus.

7. The apparatus of claim 6 wherein said plurality of raised members comprises a first raised member disposed adjacent to and parallel to a second raised member, said second raised member disposed on said exterior surface.

8. The apparatus of claim 1 further comprising a second plurality of protuberances disposed on said exterior surface, said second plurality of protuberances including a plurality of angled flanges disposed on said exterior surface of said apparatus.

9. The apparatus of claim 8 wherein said plurality of angled flanges each include a mounted end and a free end, said mounted end fixed to said exterior surface, said free end directed toward said first end of said apparatus.

10. The apparatus of claim 7 wherein said second plurality of protuberances further comprises a first angled flange mounted at a first mounting end to said first raised member and a second angled flange mounted at second mounting end to said second raised member.

11. The apparatus of claim 1 wherein said latch assembly comprises a mounting portion disposed on said exterior surface and a latch portion disposed on said mounting portion.

12. The apparatus of claim 11 wherein said mounting portion comprises a hinge element.

13. The apparatus of claim 12 wherein said hinge element comprises a living hinge.

14. The apparatus of claim 11 wherein said latching portion comprises a rigid clasp which is manually rotatable about said mounting portion.

15. The apparatus of claim 1 wherein said latch assembly comprises a pliable portion and a rigid clasp, said pliable portion mounted to said exterior surface angled toward said first end of said apparatus, said rigid clasp mounted to said pliable portion opposite said mounting, thus permitting said rigid clasp to pivot rotatably about said mounting.

16. The apparatus of claim 1 wherein said latch assembly comprises a removable latch member, a first latch port and a second latch port, said first latch port disposed at said lint end, said second latch port disposed at said first end opposite said first latch port.

17. The apparatus of claim 16 wherein said first and second latch ports comprise a detent and a mating member disposed in said detent.

18. The apparatus of claim 17 wherein said removable latch member comprises a plurality of rigid members arranged to snap fit about said mating member in said detent of said first latch port and said second latch port.

19. The apparatus of claim 18 wherein said removable latch member further comprises a protuberance for mating with a detent disposed on said interior surface of said apparatus.

20. The apparatus of claim 18 wherein said plurality of keyways comprises a first keyway and a second keyway, said second keyway disposed opposite to said first keyway.

21. The apparatus of claim 19 wherein said first latch port is disposed adjacent said first keyway and said second latch port is disposed adjacent said second keyway.

22. The apparatus of claim 1 wherein said plurality of keyways comprises a first keyway disposed at said interior surface of said first end and a second keyway disposed at said interior surface of said first end opposite said first keyway.

23. The apparatus of claim 22 further comprising a latch port for receiving said latch assembly, said latch port disposed in said exterior surface adjacent to said first keyway.

24. The apparatus of claim 1 further comprising a latch housing disposed on said exterior surface at said first end of said apparatus upon which said latch assembly is mounted.

25. The apparatus of claim 24 wherein said latch housing includes a latch cut-out channel disposed adjacent to said latch assembly.

26. The apparatus of claim 3 wherein said plurality of protuberances comprises a first alignment flange disposed perpendicularly on said inner surface of said first member, a second alignment flange disposed perpendicularly on said inner surface of said second member, a third flange disposed perpendicularly on said inner surface of said third member, and a fourth alignment flange disposed perpendicularly on said inner surface of said fourth member.

27. The apparatus of claim 2 wherein said first member includes said latch assembly.

28. The apparatus of claim 3 further comprising a hollow defined by the said inner surfaces of said first member, said second member, said third member, and said fourth member.

29. An apparatus for receiving a plurality of connector devices and for disposing said plurality of connector devices to facilitate communication among said plurality of connector devices, the apparatus comprising:

a first end including a first opening for receiving said connector devices;

a second end disposed opposite said first end, said second end including a second opening for receiving said connector devices;

an exterior surface connecting said first end and said second end;

an interior surface connecting said first end and said second end;

a plurality of protuberances disposed on said interior surface;

a plurality of keyways disposed on said interior surface at said first end and a latch assembly comprising a fixed member disposed on said exterior surface at said first end, such as to have a first position concealing only one of said plurality of keyways and a second position exposing said only one of said plurality of keyways.

30. The apparatus of claim 29 wherein said latch assembly comprises a tab disposed at said first end of said apparatus and extending there from, said tab comprising a break-away construction so as to allow permanent removal of said tab from said apparatus.

31. The apparatus of claim 30 wherein said plurality of keyways comprises a first keyway and a second keyway, said second keyway disposed opposite to said first keyway.

32. The apparatus of claim 31 wherein said tab is disposed adjacent to said first keyway.

* * * * *

UNITED STATES PATENT AND TRADEMARK OFFICE
CERTIFICATE OF CORRECTION

PATENT NO. : 6,364,537 B1
DATED : April 2, 2002
INVENTOR(S) : Charlie Maynard

It is certified that error appears in the above-identified patent and that said Letters Patent is hereby corrected as shown below:

Column 2,
Line 34, "view" insert -- of --.

Column 3,
Line 63, after "portion" delete "130" and insert therefor -- 132 --.

Column 4,
Line 41, after "100" insert therefor -- , --.

Column 6,
Line 46, after "port" delete "110".

Column 7,
Lines 10 and 16, after "removable" delete "lock" and insert therefor -- latch --.
Line 41, after "latch" delete "assembly" and insert therefor -- member --.

Column 8,
Line 38, after "adapter" delete "306" and insert therefor -- 300 --.

Column 9,
Line 59, after "said" delete "latching" and insert therefor -- latch --.
Line 60, before "comprises" delete "portion" and insert therefor -- assembly --.

Column 10,
Line 3, after "said" (second occurrence), delete "lint" and insert therefor -- first --.

Signed and Sealed this

Twenty-seventh Day of September, 2005

JON W. DUDAS
*Director of the United States Patent and Trademark Office*